US012166633B2

(12) United States Patent
Wang et al.

(10) Patent No.: US 12,166,633 B2
(45) Date of Patent: Dec. 10, 2024

(54) METHOD, DEVICE, APPARATUS, AND STORAGE MEDIUM FOR NETWORKING

(71) Applicant: TP-LINK CORPORATION LIMITED, Hong Kong (CN)

(72) Inventors: Kui Wang, Chengdu (CN); Guangjie Yang, Chengdu (CN); Kaiwen Hu, Chengdu (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/412,495

(22) Filed: Jan. 13, 2024

(65) Prior Publication Data

US 2024/0380661 A1 Nov. 14, 2024

Related U.S. Application Data

(63) Continuation of application No. 18/556,689, filed as application No. PCT/CN2023/092649 on May 8, 2023.

(30) Foreign Application Priority Data

May 9, 2022 (CN) .......................... 202210499124.3

(51) Int. Cl.
*G06F 13/00* (2006.01)
*H04L 41/08* (2022.01)
(Continued)

(52) U.S. Cl.
CPC ...... *H04L 41/0883* (2013.01); *H04L 41/0803* (2013.01); *H04L 41/0894* (2022.05)

(58) Field of Classification Search
CPC ............ H04L 41/0883; H04L 41/0803; H04L 41/0894
(Continued)

(56) References Cited

U.S. PATENT DOCUMENTS 7,421,578 B1 9/2008 Huang
9,432,250 B2 * 8/2016 Ma ........................ H04L 12/42
(Continued)

FOREIGN PATENT DOCUMENTS

CN 106789095 A 5/2017
CN 106878969 A 6/2017
(Continued)

*Primary Examiner* — Kenneth R Coulter
(74) *Attorney, Agent, or Firm* — Loeb & Loeb LLP

(57) ABSTRACT

The present disclosure relates to a method, apparatus, device and storage medium for networking. A method for networking is provided, applied to the first device to be networked and including: when the first device s in a election stage, receiving a confirmation message or an election message transmitted by other device to be networked, making a decision to confirm whether the other device transmitting the election message or the first device itself serves as a master device, if the election message is received, entering a confirmation stage in response to the confirmation message or the election message transmitted by the other device; when the first device is in the confirmation stage, setting the first device as a master device or a slave device in response to receiving the confirmation message transmitted by the other device.

11 Claims, 3 Drawing Sheets

(51) Int. Cl.
*H04L 41/0803* (2022.01)
*H04L 41/0894* (2022.01)

(58) Field of Classification Search
USPC .......................................... 709/209, 220, 224
See application file for complete search history.

(56) References Cited

U.S. PATENT DOCUMENTS

| | | | |
|---|---|---|---|
| 9,888,073 B2 * | 2/2018 | Ohana | H04L 67/1095 |
| 2015/0138950 A1 * | 5/2015 | Ma | H04L 41/0654 |
| | | | 370/223 |
| 2016/0366219 A1 * | 12/2016 | Ohana | H04L 67/1034 |
| 2023/0107301 A1 * | 4/2023 | Moradi | H04L 41/30 |
| | | | 706/12 |

FOREIGN PATENT DOCUMENTS

| | | |
|---|---|---|
| CN | 108111358 A | 6/2018 |
| CN | 104883656 B | 10/2018 |
| CN | 106034304 B | 8/2019 |
| CN | 110233746 A | 9/2019 |
| CN | 106850222 B | 11/2020 |
| CN | 108093460 B | 12/2020 |
| CN | 108712743 B | 4/2021 |
| CN | 110049532 B | 4/2021 |
| CN | 113015266 A | 6/2021 |
| CN | 113692028 A | 11/2021 |
| CN | 109716835 B | 4/2022 |
| CN | 114786162 A | 7/2022 |
| CN | 115119230 A | 9/2022 |

* cited by examiner

METHOD, DEVICE, APPARATUS, AND STORAGE MEDIUM FOR NETWORKING

CROSS-REFERENCE TO RELATED APPLICATION(S)

This application is a continuation of U.S. application Ser. No. 18/556,689 filed on Oct. 23, 2023, which is a national phase filing of International Application No. PCT/CN2023/092649 filed on May 8 2023, which claims priority to Chinese Patent Application No. 202210499124.3 filed on May 9, 2022 assigned to the assignee hereof, the disclosure of which is incorporated herein by reference in its entirety as part of the present application.

TECHNICAL FIELD

The present disclosure relates to the field of communication technology, and in particular relates to a method, device, apparatus, and storage medium for networking.

BACKGROUND

With the rapid development of information technology, people are having an increasing demand for networks. Conventional single wireless network devices can no longer meet users' demand for networks. Therefore, networking by means of wireless network devices has become the choice of more people.

SUMMARY OF THE DISCLOSURE

According to a first aspect of the disclosure, a method for networking is provided, applied to the first device to be networked and comprising: when the first device to be networked is in a election stage: receiving a confirmation message or an election message transmitted by other device to be networked, making a decision to confirm whether the other device to be networked transmitting the election message or the first device to be networked itself serves as a master device, if the election message is received, entering a confirmation stage in response to the confirmation message or the election message transmitted by the other device to be networked; when the first device to be networked is in the confirmation stage: setting the first device to be networked as a master device or a slave device in response to receiving the confirmation message transmitted by the other device to be networked; wherein the election message includes at least information associated with the device to be networked transmitting the election message; and wherein the confirmation message includes at least information associated with the master device that is confirmed by the network device to be networked transmitting the confirmation message.

According to embodiments of the disclosure, setting the first device to be networked as a master device or a slave device further comprises: setting the first device to be networked as the master device or the slave device based on at least one of the received confirmation messages that is transmitted by other device to be networked when the first device is in the confirmation stage and result of the decision of the master device made when the first device is in the election stage.

According to embodiments of the disclosure, the method further comprises at least one of the following: when the first device to be networked is in the election stage, repeatedly transmitting the election message; and after entering the confirmation stage, repeatedly transmitting the confirmation message until completion of the networking.

According to embodiments of the disclosure, when the first device to be networked enters the confirmation stage in response to a confirmation message received from other devices to be networked, the first device to be networked confirms that the master device indicated in the confirmation message received from the other device to be networked serves as the master device.

According to embodiments of the disclosure, the election message and the confirmation message include a first field indicating whether the message is the election message or the confirmation message; the election message and the confirmation message also include a second field, the second field of the election message indicates MAC address of the device to be networked transmitting the election message, the second field of the confirmation message indicates MAC address of the device to be networked that is confirmed as the master device.

According to embodiments of the disclosure, the election message further includes a third field, the third field indicates a metric of capability of the network device to be networked transmitting the election message to serve as a master device, wherein making a decision to confirm whether the other device to be networked transmitting the election message or the first device to be networked itself serves as a master device comprises: comparing the third field of the election message received from the other device to be networked with the third field of the election message transmitted by the first device to be networked, and setting the other device to be networked or the first device to be networked itself as the master device based on result of the comparison.

According to embodiments of the disclosure, in the third field of the election message received from the other device to be networked and the third field of the first device to be networked are equal, the second field of the election message received from the other device to be networked is compared with the second field of the election message transmitted by the first device to be networked, and the other device to be networked or the first device to be networked is set as the master device based on the result of the comparison.

According to embodiments of the disclosure, there are multiple devices to be networked, and comparing the third field of the election message received from the other device to be networked with the third field of the election message transmitted by the first device to be networked and setting the other device to be networked or the first device to be networked itself as the master device based on result of the comparison further comprises: comparing the third field of the election message received from each of the other devices to be networked with the third field of the election message transmitted by the first device to be networked and setting one of the plurality of other devices to be networked or the first device to be networked as the master device based on the result of the comparison.

According to a second aspect of the disclosure, an apparatus for networking is provided, applied to the first device to be networked and comprising: an election stage module, when the first device to be networked is in a election stage, used to: receive a confirmation message or an election message transmitted by other devices to be networked, make a decision to confirm whether the other device to be networked transmitting the election message or the first device to be networked itself serves as a master device, if the election message is received, and enter a confirmation stage in response to the confirmation message or the election message transmitted by the other device to be networked; a confirmation stage module, when the first device to be networked is in the confirmation stage, used to: set the first device to be networked as a master device or a slave device in response to receiving the confirmation message transmitted by the other device to be networked; wherein the election message includes at least information associated with the device to be networked transmitting the election message; and wherein the confirmation message includes at least information associated with the master device that is confirmed by the network device to be networked transmitting the confirmation message.

According to a third aspect of the disclosure, an electronic device is provided, comprising a processor, a memory and a computer program stored in the memory and configured to be executed by the processor, the processor performs the method according to the first aspect of the disclosure when performing the computer program.

According to a fourth aspect of the disclosure, a computer-readable storage medium is provided, comprising a stored computer program to control a device where the computer-readable storage medium is located to perform the method according to the first aspect of the disclosure when the computer program is running.

According to a fifth aspect of the disclosure, a communication system is provided, including at least two devices to be networked, each of the at least two devices to be networked is configured to: when in a election stage: transmit election messages, receive messages from other device to be networked, make a decision to confirm whether the other device to be networked transmitting a election message or the first device to be networked itself serves as a master device, if the election message is received from the other device to be networked, enter a confirmation stage in response to a confirmation message or the election message transmitted by the other device to be networked; when in the confirmation stage: transmit a confirmation message, receive messages from other device to be networked, set itself as the master device or a slave device in response to receiving the confirmation message transmitted by the other device to be networked; wherein the election message includes at least information associated with the device to be networked transmitting the election message; and wherein the confirmation message includes at least information associated with the master device that is confirmed by the network device to be networked transmitting the confirmation message.

The method, apparatus, electronic device, storage media, and communication system of the disclosure can be used for master-slave election between wireless devices that currently support networking, and to complete automatic networking functions.

The additional aspects and advantages of the disclosure will be partially provided in the following description, and some will become apparent from the following description or learned through the practice of this disclosure.

DESCRIPTION OF THE EMBODIMENTS

Figure 1:
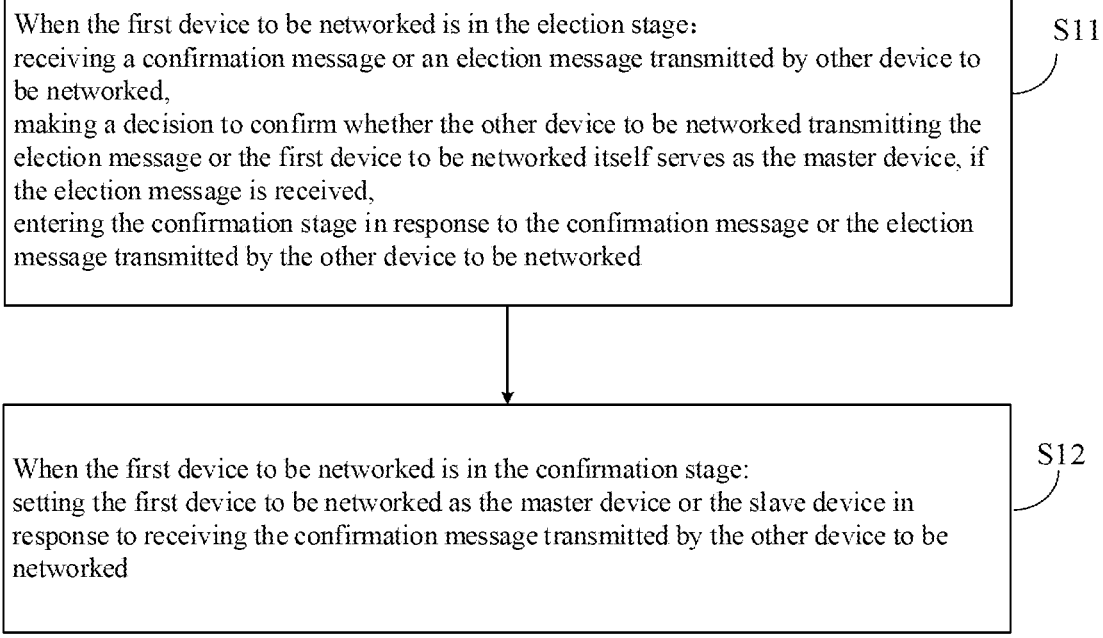
FIG. 1 is a schematic flowchart of a method for networking of communication devices according to the embodiments of the present disclosure.

Embodiments of the present disclosure are detailed as follows, examples of which are illustrated in the accompanying drawings, in which the same or similar reference numerals throughout refer to the same or similar elements or elements having the same or similar functions. The embodiments described below by referring to the figures are exemplary and are intended to explain the present disclosure and should be constructed as limiting the present disclosure.

In order to facilitate those skilled in the art to understand the embodiment, some terms are explained:
(1) MAC: media access control.
(2) Beacon: beacon.
(3) BSS: basic service set.

In conventional wireless networking devices, there are generally two roles: master device and slave device, such as Controller (master device) and Agent (slave device) in the EasyMesh network. In the EasyMesh network, the Controller serves as the management center of the entire EasyMesh network. It is mainly responsible for the network access configuration of other nodes, receiving information such as link quality and network capacity from other nodes, and controlling the node's channel selection, device roaming, load balancing, and so on. Except for the Controller, all other agents in the EasyMesh network are Agents. The Agent is mainly responsible for receiving messages from the Controller and other Agents, and reporting link quality reports, standby volume and other information to the Controller.

However, the wireless networking device currently on the market still has the following problems during the networking process:
1) Users are required to manually configure the wireless network device as the master device or slave device before starting the networking process.
2) Before using the wireless network device normally, users need to log in to the management page multiple times to make relevant settings, which increases user costs and reduces user experience.
3) Users generally do not have relevant networking background knowledge, so it is easy to make mistakes when making relevant settings on the management page. The user learning cost is high and it is not user-friendly.

Before wireless networking devices can be networked, it is necessary to manually set the devices participating in the network as slave devices or master devices, which makes the networking process very cumbersome; in addition, although there are currently very few wireless networking devices where the determination of the master device and the slave device can be completed through a wired connection, it still requires to manually connect each device with network cables, so that there is not only the cost of additional network cables, but also it cannot be used for networking between wireless devices without network ports, which is not generally applicable and is difficult for population.

In order to solve the above technical problems, embodiments of the present disclosure provide a communication system, including a plurality of network devices to be networked, at least two of the plurality of network devices to be networked, comprising a first network device to be networked and a second network device to be networked, are wireless network devices that support working as a master device or a slave device at the same time. In other words, the first device to be networked or the second device to be networked may be subsequently determined as the master device. Regardless of whether the first device to be networked or the second device to be networked is determined to be the master device, the first device to be networked or the second device to be networked can perform normal configuration, normal networking, and normal operation after networking.

Figure 4:
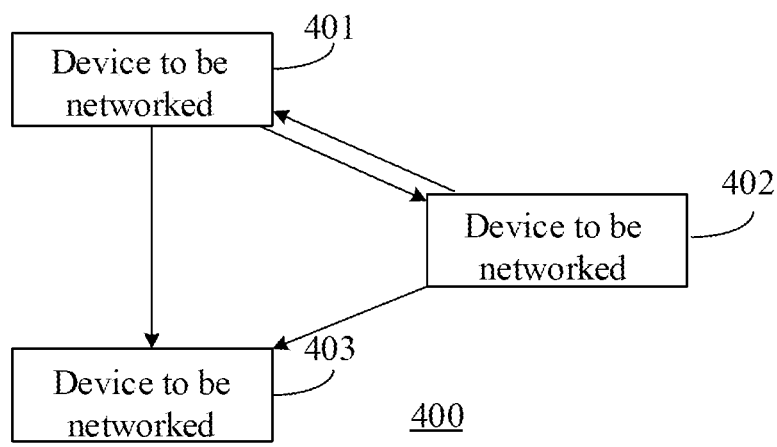
FIG. 4 is a schematic diagram of a communication system according to the embodiments of the present disclosure.

A non-limiting example of such a system is illustrated with reference to FIG. 4. As shown in FIG. 4, the communication system 400 includes a plurality of devices to be networked 401, 402, 403, etc., wherein at least the first device to be networked 401 and the second device to be networked 402 can execute the networking method based on the master-slave election, for example, can transmit election messages and confirmation messages, and can receive election messages and confirmation messages from other networking devices for master-slave election. It should be understood that what is shown in FIG. 4 is only a non-limiting example, the communication system may include more or fewer devices to be networked, and the devices to be networked that can perform master-slave election are not limited to two devices to be networked network device.

Specifically, in the embodiments of the present disclosure, at least two wireless network devices are used as a non-limiting example of the devices to be networked to automatically determine the master device and the slave device, and then automatically determine one of the wireless network devices as the master device, and the other A wireless network device is identified as a slave device without human manual involvement.

Further, in the embodiments of the present disclosure, the first device to be networked and the second device to be networked can be controlled to enter the election stage by means of keystrokes or intelligent control and end the networking process.

As shown in FIG. 1, an embodiment of the present disclosure also provides a method 100 for networking of communication devices, and method 100 can be applied to a first device to be networked (for example, the device to be networked 401 in FIG. 4).

Referring to FIG. 1, in step S11, when the first device to be networked is in the election stage (step S11): the first device to be networked (for example, the device to be networked 401 in FIG. 4) can receive messages from other devices to be networked (for example, device to be networked 402 in FIG. 4). If an election message is received from other devices to be networked, a decision is made to confirm whether the other device to be networked transmitting the election message (for example, the device 402 in FIG. 4) or the first device to be networked itself (for example, the device to be networked 401 in FIG. 4) serves as the master device. The network device itself (for example, the device to be networked 401 in FIG. 4) is utilized as the master device. In response to receiving confirmation messages or election messages from other devices to be networked, the device enters the confirmation stage (step S12).

In particular, the election message may include at least information associated with the device to be networked transmitting the election message. For example, in step S11, the election message transmitted from the first device to be networked 401 may include information indicating that the device to be networked transmitting the election message is the first device to be networked 401, such as but not limited to the MAC address of the first device to be networked 401 to identify the first device to be networked 401 participating in the master-slave election; the election message received by the first device to be networked 401 from the second device to be networked 402 may include information indicating that the device to be networked transmitting the election message is the second device to be networked 402, such as but not limited to the MAC address of the second device to be networked, thereby identifying second device to be networked 402 participating in the master-slave election.

Also, in particular, the confirmation message may at least include the information associated with the master device that is confirmed by the device to be networked transmitting the confirmation message. In embodiments according to the present disclosure, the confirmation message may at least include information indicating the device to be networked confirmed as the master device by the device to be networked transmitting the confirmation message. For example, in step S11, the confirmation message received by the first device to be networked 401 from the second device to be networked 402 may include information indicating the device to be networked confirmed as the master device by the second device to be networked 402. For example, in the case where the second device to be networked 402 confirms that the first device to be networked 401 is the master device, the confirmation message received by the first device to be networked 401 from the second device to be networked 402 may include information indicating the first device to be networked 401, such as but not limited to the MAC address of the first device to be networked 401. For example, in the case where the second device to be networked 402 confirms that the second device to be networked 402 is the master device, the confirmation message received by the first device to be networked 401 from the second device to be networked 402 may include information indicating the second device to be networked 402, such as but not limited to the MAC address of the second device to be networked 402.

In embodiments according to the present disclosure, the election message and the confirmation message may include a first field that may indicate whether the message is an election message or a confirmation message.

In embodiments according to the present disclosure, the election message and the confirmation message may further include a second field. As a non-limiting example, the second field of the election message may indicate the MAC address of the device to be networked transmitting the election message, and the second field of the confirmation message may indicate the MAC address confirmed as the master device by the device to be networked transmitting the confirmation message.

In embodiments according to the present disclosure, the election message may further include a third field, and the third field of the election message may indicate a metric of the capability of the device to be networked transmitting the election message to serve as a master device. For example, the election message received by the first device to be networked 401 from the second device to be networked 402 may include a metric of the capability of the second device to be networked 402 to serve as a master device. For example, the third field may be the potential value of the device to be networked to serve as the master device. The potential value is an evaluation value or score of the first device to be networked to serve as the master device that is calculated based on the relevant parameters of the first device to be networked. In particular, the relevant parameters may include user service quality, channel quality, interference, etc. Furthermore, different relevant parameters can be set with different weights, and then summed to obtain the metric.

In the embodiments of the present disclosure, wireless broadcast messages are used as the carrier of information exchange in the networking process. That is, the election messages, confirmation messages and other messages involved in the embodiments of the present disclosure are all based on wireless broadcast messages as carriers for transmission.

Further, in the embodiments of the present disclosure, in the process of determining the master device and the slave device, the first device to be networked and the second device to be networked have no priority difference and have the same authority to be determined as the master device or the slave device. Therefore, in the embodiments of the present disclosure, with reference to the explanation in regards to the determination process of the first device to be networked, the determination process of the second device to be networked can be similarly obtained.

In an actual application scenario, when the first device to be networked determines to participate in the networking, the first device to be networked can enter the election stage, and when the first device to be networked is in the election stage, the first device to be networked can transmit election messages repeatedly (for example, periodically).

In embodiments according to the present disclosure, if the first device to be networked 401 receives the election message from other devices to be networked (for example, the device to be networked 402) when the first device to be networked 401 is in the election stage in step S11, a decision is made before entering the confirmation stage (step S12) to confirm whether the other device to be networked transmitting the election message (i.e., the device to be networked 402) or the first device to be networked itself (i.e., the device to be networked 401) is set as the master device. For example, in the embodiment where the election message includes the third field described above, the first device to be networked 401 can compare the third field of the received election message with the third field of the election message transmitted by the first network device 401 before entering the confirmation stage in step S12, and the first network device 401 or the second network device 402 is set as the master device based on the result of the comparison. In embodiments according to the present disclosure, when the third field of the received election message is equal to the third field of the election message transmitted by the first network device 401, other fields in the received election message (such as but not limited to, the second field, that is, the MAC address) can be compared with the corresponding fields of the election message transmitted by the first network device 401, and the first device to be networked 401 or the second device to be networked 402 is set as the master device based on the result of the comparison. In the case of comparison based on MAC address, for example, the device with a larger or smaller MAC address can be set as the master device.

In embodiments according to the present disclosure, making a decision to confirm whether other devices to be networked transmitting election messages or the first device to be networked itself serve as the master device may involve the situation where election messages are received from multiple devices to be networked. In response to the election messages transmitted from multiple other devices to be networked, a decision may be made based on the magnitude of the third field of the election message to confirm which device to be networked among the multiple other devices to be networked transmitting the election messages and the first device to be networked itself serves as the master device. Specifically, in the example shown in FIG. 4, the device to be networked 401 can receive the election message transmitted by the device to be networked 402 and the election message transmitted by the device to be networked 403, and determine whether the device to be networked 402, the device to be networked 403, or the device to be networked 401 itself serves as the master device based on the magnitudes of the third fields of the election message from the device to be networked 402 and of the election message from the device to be networked 403. As a non-limiting example, the device to be networked 401 can compare the capability metric represented by the third field of the election message received from the device to be networked 402 and the device to be networked 403 with the capability metric of the device to be networked 401 itself, and elect the device to be networked with the highest value represented by the third field (which can correspond to the highest capability) as the master device.

In embodiments according to the present disclosure, when the first device to be networked 401 is in the election stage in step S11, the first device to be networked 401 enters the confirmation stage directly (step S12) if receiving a confirmation message from other devices to be networked (for example, the device to be networked 402).

According to embodiments of the present disclosure, when the first device to be networked enters the confirmation stage in response to a confirmation message received from other devices to be networked, the first device to be networked confirms that the master device as indicated in the confirmation message received from the other device to be networked serve as the master device. For example, if the first device to be networked 401 receives a confirmation message from other devices to be networked (for example, the device to be networked 402) when in the election stage, the master device as indicated in the confirmation message transmitted by the first device to be networked 401 during the confirmation stage is the master device as indicated in the confirmation message received by the first device to be networked 401 from other devices to be networked (for example, the device to be networked 402) during the election stage.

Referring to FIG. 1, in step S12, when the first device to be networked (for example, the device to be networked 401 in FIG. 4) is in the confirmation stage: the first device to be networked can repeatedly transmit a confirmation message, receive messages from other devices to be networked, and in response to receiving confirmation messages from other devices to be networked, set the first device to be networked as a master device or a slave device based on the confirmation messages from other devices to be networked.

Specifically, in the setting stage, the first device to be networked 401 can obtain the information for the master device based on the confirmation message, such as but not limited to the MAC address; then the information for the master device can be compared with its own information, and if they are consistent, Then set itself as the master device and enter the normal networking process; if not, set itself as the slave device and enter the normal networking process.

In the embodiment according to the present disclosure, the first device to be networked 401 may transmit a confirmation message (for example, periodically) after entering the confirmation stage until the completion of the networking process.

The first device to be networked obtains the networking message, determines the state of the second device to be networked based on the networking message, generates a confirmation message and enters the confirmation state if the second device to be networked is in the election state or determines the master device based on the networking message and enters the confirmation state if the second device to be networked is in the confirmation state.

In the embodiment of the present disclosure, when the first device to be networked in the election state receives the networking message transmitted from the second device to be networked, the networking message is analyzed so that the state of the second device to be networked is determined based on the result of the analysis; where the result of the analysis includes the current state of the second device to be networked; that is, the first set of parameters and the second set of parameters also include state parameters; then, the subsequent process is determined based on the state of the second device to be networked.

Further, the first device to be networked in the election state enters the setting state if receiving a confirmation message transmitted by the second device to be networked in the confirmation state;

specifically, the election message includes a first set of parameters of the first device to be networked;

in particular, the first set of parameters includes first first-level parameters and first second-level parameters. that is, when the first device to be networked parses the network networking message and obtains the second first-level parameters and the second second-level parameters, it can be determined that the second device to be networked is in the election state.

Further, determining the state of the second device to be networked based on the networking message, generating a confirmation message and entering the confirmation State if the second device to be networked is in the election state includes:

obtaining the first first-level parameters;

obtaining a second set of parameters of the second device to be networked based on the networking message; the second set of parameters includes a second first-level parameter and a second second-level parameter;

comparing the first first-level parameters and the second first-level parameters;

if the first first-level parameter is not equal to the second first-level parameter, generating the confirmation message based on the MAC address of the first device to be networked or the MAC address of the second device to be networked, and entering the confirmation state; if the first first-level parameter is equal to the second first-level parameter, comparing the first second-level parameter and the second second-level parameter, and obtaining a comparison result;

generating the confirmation message based on the MAC address of the first device to be networked or the MAC address of the second device to be networked, and entering the confirmation state.

For example, the first first-level parameter data may specifically be the first master device potential value, and the first master device potential value is an evaluation value or score of the first device to be networked to serve as the master device that is calculated based on the relevant parameters of the first device to be networked. In particular, the relevant parameters may include user service quality, channel quality, interference, etc. Similarly, the second master device potential value of the second device to be networked can be obtained.

Furthermore, different relevant parameters can be set with different weights, and then summed up to obtain a score value, that is, the first master device potential value; similarly, the second master device potential value can be obtained.

In addition, the first second-level parameter may be the first MAC address. Similarly, the second second-level parameter may be the second MAC address. In this regard, the embodiments of the present disclosure do not specifically impose limitations to this. In actual application scenarios, the categories of parameters contained in the first or second set of parameters can be determined according to actual needs. Also, the order or level in which each category of parameters contained in the first or second set of parameters participates in subsequent algorithm calls can be determined according to actual needs.

In the embodiments of the present disclosure, in order to ensure the effectiveness of the election process and thus smoothly enter the confirmation state, when the first master device potential value and the second master device potential value are equal to each other, the determination of the master device and the slave device is based on the magnitudes of the first second-level parameter and the second second-level parameter.

Further, if the first first-level parameter is not equal to the second first-level parameter, generating the confirmation message based on the MAC address of the first device to be networked or the MAC address of the second device to be networked includes: if the first first-level parameter is greater than the second first-level parameter, generating the confirmation message based on the MAC address of the first device to be networked and entering the confirmation state;

if the first first-level parameter is smaller than the second first-level parameter, generating the confirmation message based on the MAC address of the second device to be networked and entering the confirmation state.

Further, the confirmation message includes at least the MAC address of the master device.

In an optional embodiment of the present disclosure, the first set of parameters and the second set of parameters may include other types of parameters in addition to the master device potential value, the MAC address and the state parameters, for determining the master device and the slave device. For example, when the master device and the slave device cannot be determined based on the magnitudes of the first second-level parameters and the second second-level parameters, the determination of the master device and the slave device may also be made based on other parameters.

In the embodiments of the present disclosure, based on the data interactions between the first device to be networked and the second device to be networked, the first device to be networked and the second device to be networked can automatically determine the master device and the slave device, thereby avoiding the cumbersome configuration of master and slave devices before networking. After the determination of the master device and slave device, the regular networking process can directly begin, without manually setting the master device or slave device, and without additional network cables, which reduces costs and expands the scope of the application.

In addition, after the automatic determination of the master device and slave devices, the regular networking process can directly begin and can be applied normally. Therefore, users do not need to log in to the management page multiple times to make relevant settings before using the wireless network device normally, which reduces the cost of user by the user and improves the experience of the user.

Specifically, if the second device to be networked is in the confirmation state, determining the master device and the slave device based on the networking message includes: if the second device to be networked is in the confirmation state, entering the setting state; obtaining the MAC address of the master device based on the networking message; comparing the MAC address of the master device with the MAC address of the first device to be networked:

- if the MAC address of the master device is the same as the MAC address of the first device to be networked, determining the first device to be networked as the master device;
- if the MAC address of the master device is different from the MAC address of the first device to be networked, determining the first device to be networked as the slave device.

In the embodiment of the present disclosure, if the first device to be networked in the confirmation state receives the confirmation message transmitted by the second device to be networked in the confirmation state, it directly enters the setting state;

The first device to be networked obtains the MAC address of the master device based on the confirmation message; and then compares the MAC address of the master device with its own MAC address. If they are consistent, it sets itself as the master device and enters the regular networking process; if they are inconsistent, it sets itself as a slave device and enters the regular networking process.

In an optional embodiment of the present disclosure, when the first device to be networked is in the confirmation state, it transmits the confirmation message and receives the networking message. Determining the state of the second device to be networked according to the networking message further includes:

- not processing the networking message if the second device to be networked is in the election state;
- continuing to receive the networking message until the second device to be networked is in the confirmation state, then entering the setting state;
- determining the master device and the slave device based on the networking message.

In the embodiment of the present disclosure, the first device to be networked will not enter the setting state until it receives a confirmation message from the second device to be networked, and then determine and set the master device and the slave device.

Optionally, further include:
- deciding whether the first device to be networked has completed networking;
- if the first device to be networked has completed networking, the first device to be networked stopping transmitting the confirmation message.

In the embodiments of the present disclosure, by controlling the ending time of transmission of the confirmation message of the first device to be networked, the problem that the second device to be networked cannot receive the confirmation message transmitted by the first device to be networked due to the probabilistic packet loss of wireless broadcast messages is solved. The problem of networking failure is also solved, where the second device to be networked has not received any election message or confirmation message transmitted by any first device to be networked if the first device to be networked stops transmitting the wireless broadcast message and enters the setting state upon obtaining the confirmation message, causing the networking failure.

Figure 2:
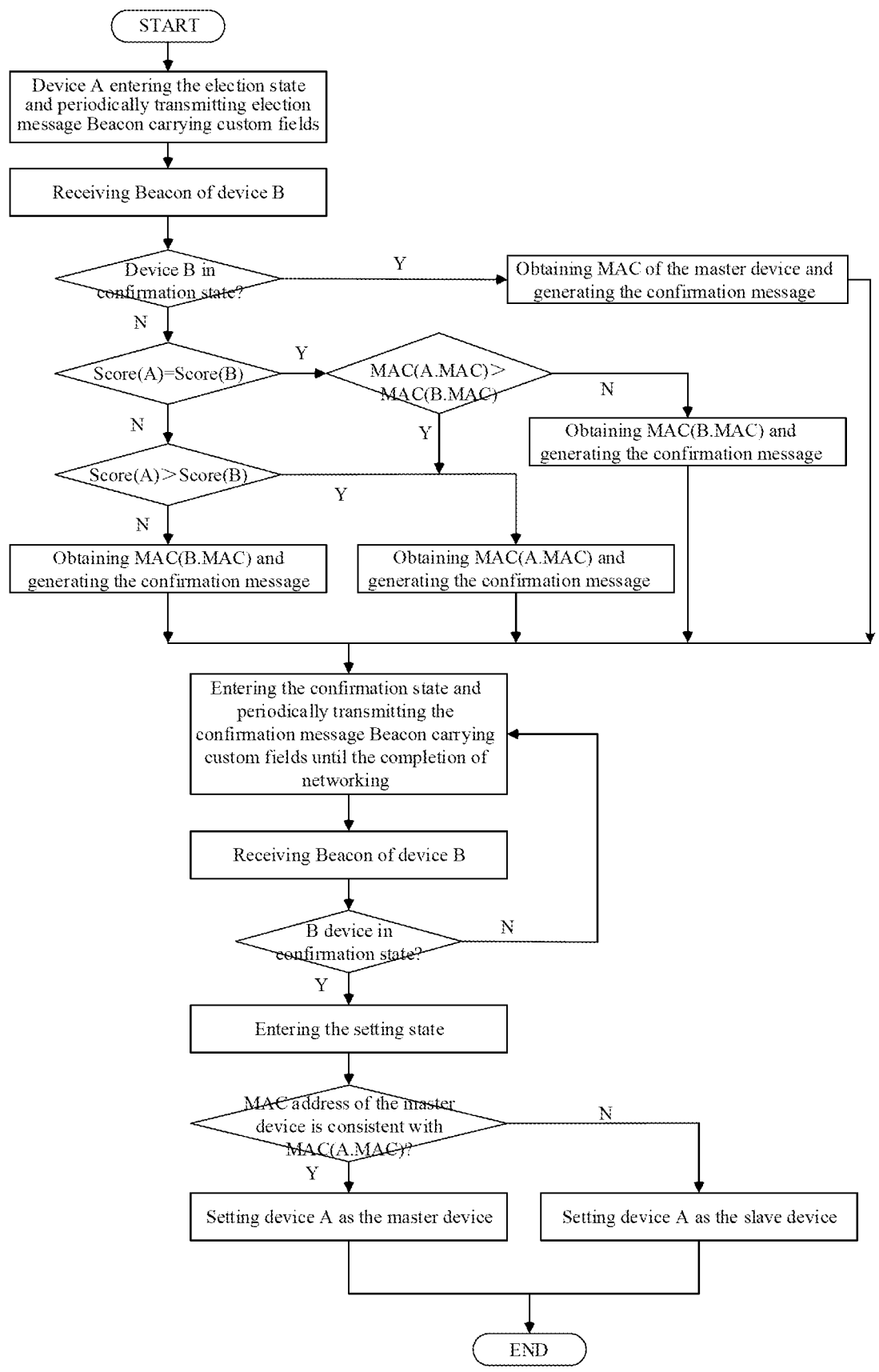
FIG. 2 is an example of a flow of a method for networking of communication devices according to the embodiments of the present disclosure.

Embodiments of the present disclosure, as shown in FIG. 2, can be implemented based on the following:

In particular, Beacon is taken as an example of the wireless broadcast message, and the manufacturer's customization of fields is illustrated based on Table 1 as follows.

TABLE 1

| Field | Byte | Optional Value | Descriptions |
|---|---|---|---|
| Tag Number | 1 Byte | 0XDD | 0XDD indicates that this field is a manufacturer-custom field. |
| Tag length | 1 Byte | 0X09 | Indicating the length of the custom field that does not include the number of bytes occupied by Tag Number and Tag length. |
| State | 1 Byte | 0X01/ 0X02 | Indicating the election state: election (0X01), confirmation (0X02). |
| Score | 1 Byte | 0X00- 0X64 | Indicating the master device potential value of the wireless networking device to serve as the master device. The wireless networking device itself gives a specific value based on the preset unified evaluation algorithm. The default value is 0X00. |
| MAC | 6 Byte | | Indicating the BSS MAC address of the wireless networking device. In the election stage, fill in the BSS MAC address of the wireless networking device itself, and in the confirmation state, fill in the BSS MAC address elected as the master device. |

Specifically, two wireless networking devices that support both master device and slave device functions are selected, referred to as device A and device B respectively. Currently, device A and device B are in the same mode;

For example, an election message for device A is generated based on State (0X01), Score (A), and MAC (A.MAC)). In particular, the State can be the first field of the Beacon message, indicating that the message is an election message or a confirmation message. For example, State (0X01) indicates that the current state of device A is 0X01, i.e., the election state. Score can be the third field of the Beacon message, indicating a metric of the capability that the device to be networked transmitting the Beacon message to serve as the master device. For example, Score (A) represents the master device potential value of device A, which is a specific value obtained by actual calculation, such as 0X08 or 0X18, etc. For the convenience of description, the embodiment of the present disclosure uses the representation of Score(A). MAC can be the second field of the Beacon message. If the Beacon message is an election message, the second field is MAC (A.MAC)), indicating the MAC address of the device A transmitting the election message. If the message Beacon is a confirmation message, the second field is MAC (MAC_M), indicating the MAC address of the device determined to be the master device. Similarly, the information for device B can be obtained as mentioned above.

Since the process and principle for device A and device B to participate in determining the master device and the slave device are the same, in the embodiment of the present disclosure, the process of device A to participate in determining the master device and the slave device is specifically explained:

1) Device A enters the election state. For example, device A is controlled to enter the election state based on a certain control key on device A, or any other feasible method is used to control device A to enter the election state. The embodiments of this disclosure do not impose any limitations to this;

2) After device A enters the election state, it generates an election message based on its own state information, and periodically transmits election messages Beacon (State(0X01), Score(A), MAC(A.MAC))) carrying custom fields. At the same time, device A listens to the Beacon of device B. If it receives the Beacon of device B, it extracts the custom information in the frame and makes a decision;

3) If the state field of device B is State (0X02), indicating that device B is in the confirmation state, based on the Beacon of device B, device A obtains the MAC address of the master device, and then enters the confirmation state. Device A compares the magnitudes of MAC (A.MAC) and the MAC address of the master device. If the MAC (A.MAC) is consistent with the MAC address of the master device, then the device A is set as the master device and enter the normal networking process; if the MAC (A.MAC) is inconsistent with the MAC address of the master device, then the device A is set as a slave device and enter the regular networking process;

4) If the state field of device B is State (0X01), indicating that device B is in the election state, then the magnitudes of Score(A) and Score(B) are compared;

If Score(A)>Score(B), device A can determine itself as the master device, obtain the MAC (A.MAC), generate a confirmation message, and then enter the confirmation state; if Score(A)<Score(B), device A can determine the device B as the master device, obtain the MAC (B.MAC), generate a confirmation message, and then enter the confirmation state;

If Score(A)=Score(B), device A can compare MAC(A.MAC) and MAC(B.MAC);

If MAC(A.MAC)>MAC(B.MAC), device A can determine itself as the master device, obtain MAC(A.MAC), generate a confirmation message, and then enter the confirmation state;

If MAC (A.MAC)<MAC (B.MAC), device A can determine device B as the master device, obtain MAC (B.MAC), generate a confirmation message, and then enter the confirmation state;

5) After device A enters the confirmation state, it will periodically transmit confirmation messages Beacon carrying custom fields until device A completes the networking. At the same time, device A listens to the Beacon of device B. If it receives the Beacon from device B, the custom information in the Beacon frame is extracted for decisions;

6) If the state field of device B is State (0X01), indicating that device B is in the election state, device A ignores the Beacon of device B, and continues to transmit the confirmation message Beacon. At the same time, the device A listens to the Beacon of the device B. If it receives the Beacon from device B, the custom information in the Beacon frame is extracted for decisions;

7) If the state field of device B is State (0X02), indicating that device B is in the confirmation state, device A enters the setting state and compares the magnitudes of the MAC (A.MAC) and the MAC address of the master device.

8) If the MAC (A.MAC) is consistent with the MAC address of the master device, device A sets itself as the master device and enters the normal networking process;

If the MAC (A.MAC) is inconsistent with the MAC address of the master device, device A sets itself as a slave device and enters the normal networking process.

9) After device A completes the networking, it stops transmitting the confirmation message Beacon.

Figure 3:
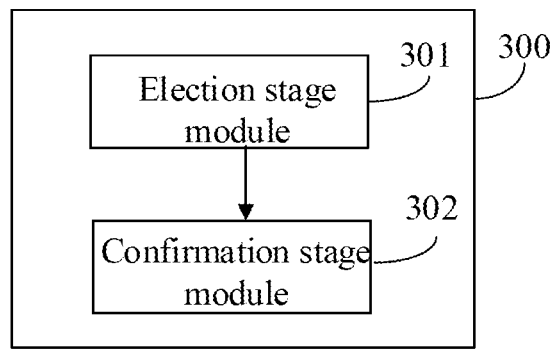
FIG. 3 is a schematic structural diagram of an apparatus for networking of communication devices according to the embodiments of the present disclosure.

As shown in FIG. 3, embodiments of the present disclosure also provide an apparatus 300 for networking of communication devices, which is applied to the first device to be networked and includes an election stage module 301 and a confirmation stage module 302.

In particular, when the first device to be networked is in the election stage, the election stage module 301 can be used to: transmit an election message, and determine whether confirmation messages and election messages from other devices to be networked are received, and enter the confirmation stage if it receives a confirmation message or an election message from other devices to be networked.

When the first device to be networked is in the confirmation stage, the confirmation stage module 302 can be used to transmit a confirmation message, determine whether confirmation messages from other devices to be networked are received, and set the first device to be networked as a master device or a slave device if it receives confirmation messages from other devices to be networked.

In particular, the election message includes at least information associated with the device to be networked transmitting the election message.

In particular, the confirmation message includes at least information associated with the device to be networked determined as the master device by the device to be networked transmitting the confirmation message.

Embodiments of the present disclosure also provide an electronic device, including a processor, a memory, and a computer program stored in the memory and configured to be executed by the processor. The processor implements the above-described method when executing the computer program.

Embodiments of the present disclosure also provide a computer-readable storage medium, including a stored computer program to control a device where the computer-readable storage medium is located to perform the above-described method.

The advantages of the solution of present disclosure as described above include:

1) Based on the data interaction between the first device to be networked and the second device to be networked, the first device to be networked and the second device to be networked can automatically determine the master device and the slave device, thereby avoiding the cumbersome configuration of master and slave devices before networking. After the determination of the master device and slave device, the regular networking process can directly begin, without manually setting the master device or slave device, and without additional network cables, which reduces costs and expands the scope of the application. In addition, since the master device and the slave device are automatically determined, the regular networking process can begin directly and the device can be used normally. Therefore, the user does not need to log in to the management page multiple times to make relevant settings before using the wireless network device normally, which reduces the cost of user by the user and improves the experience of the user.

2) By controlling the ending time of transmission of the confirmation message of the first device to be networked, the problem that the second device to be networked cannot receive the confirmation message transmitted by the first device to be networked due to the probabilistic packet loss of wireless broadcast messages is solved. The problem of networking failure is also solved, where the second device to be networked has not received any election message or confirmation message transmitted by any first device to be networked if the first device to be networked stops transmitting the wireless broadcast message and enters the setting state upon obtaining the confirmation message, causing the networking failure.

In addition, other structures and functions of the devices in the embodiments of the present disclosure are known to those skilled in the art and will be omitted here to reduce redundancy.

It should be noted that the logic and/or steps represented in the flowcharts or otherwise described herein, for example, may be considered to be a sequenced list of executable instructions for implementing logical functions, which may be embodied in any computer, readable medium for use by or in conjunction with an instruction execution system, apparatus, or device (such as a computer-based system, a system including a processor, or other system that can fetch and execute instructions from the instruction execution system, apparatus, or device). For the purposes of this specification, a "computer-readable medium" may be any device that can contain, store, communicate, propagate, or transport a program for use by or in connection with an instruction execution system, apparatus, or device. More specific examples of computer-readable media (a non-exhaustive list thereof) include the following: electrical connection with one or more wires (electronic device), portable computer disk cartridge (magnetic device), random access memory (RAM), Read-only memory (ROM), erasable programmable read-only memory (EPROM or flash memory), fiber optic devices, and portable compact disc read-only memory (CDROM). Additionally, the computer-readable medium may even be paper or other suitable media on which the program may be printed, as the paper or other medium may be optically scanned, for example, and subsequently edited, interpreted, or otherwise processed to electronically obtain the program and store it in the memory of the computer.

It should be understood that various parts of the present disclosure may be implemented in hardware, software, firmware, or a combination thereof. In the above embodiments, various steps or methods may be implemented in software or firmware stored in a memory and executed by a suitable instruction execution system. For example, if it is implemented in hardware, as in another embodiment, it can be implemented by any one or a combination of the following technologies known in the art: discrete logic circuits with logic gate circuits for implementing logic functions on data signals, application specific integrated circuits with suitable combinational logic gates, programmable gate arrays (PGAs), field programmable gate arrays (FPGAs), etc.

In the description of this specification, reference to the terms "one embodiment", "some embodiments", "an example", "specific examples", or "some examples" or the like means that the specific features, structures, materials or characteristics described in connection with the embodiment or example are included in at least one embodiment or example of the present disclosure. In this specification, schematic representations of the above terms do not necessarily refer to the same embodiment or example. Furthermore, the specific features, structures, materials or characteristics described may be combined in any suitable manner in any one or more embodiments or examples.

In the descriptions of the present disclosure, it is to be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", and so on indicating the orientations or positional relationships are based on the orientations or positional relationships shown in the drawings, and are only for the convenience of describing the present disclosure and simplifying the description, rather than indicating or implying the referred devices or elements must have a specific orientation, be constructed and operate in a specific orientation and therefore are not to be construed as limitations on the disclosure.

In addition, the terms "first" and "second" are used for the purposes of description only, and cannot be interpreted as indicating or implying relative importance or implicitly specifying the quantity of indicated technical features. Thus, the features defined with "first" and "second" may explicitly or implicitly include at least one of these features. In the description of the present disclosure, "plurality" means at least two, such as two, three, etc., unless otherwise specifically defined.

In this disclosure, unless otherwise explicitly stated and limited, the terms "installation", "coupling", "connection", "fixing" and other terms should be understood in a broad sense. For example, it can be a fixed connection or a detachable connection, or integrated into one; it can be a mechanical connection or an electrical connection; it can be a direct connection or an indirect connection through an intermediate medium; it can be an internal connection between two elements or an interactive relationship between two elements, unless otherwise specified restrictions. Those skilled in the art can understand the specific meanings of the above terms in the present disclosure according to specific situations.

In the present disclosure, unless otherwise clearly stated and limited, a first feature being "on" or "under" a second feature may mean that the first and second features are in direct contact or in indirect contact through an intermediary. Moreover, the first feature "above", "on" and "over" the second feature may mean that the first feature is directly above or obliquely above the second feature, or simply means that the first feature is higher in level than the second feature. the first feature "below", "under" and "underneath" the second feature may mean that the first feature is directly below or obliquely below the second feature, or simply means that the first feature is lower in level than the second feature.

Although the present disclosure has been shown and described above, it can be understood that the above-mentioned embodiments are illustrative and should not be construed as limitations to the present disclosure. Those skilled in the art can make various changes, modifications, substitutions and variations to the above-described embodiments within the scope of the present disclosure.

What is claimed is:

1. A method for networking applied to a first device to be networked, comprising:

when the first device to be networked is in an election stage:
receiving a confirmation message or an election message transmitted by an other device to be networked,
making a decision to confirm whether the other device to be networked transmitting the election message or the first device to be networked itself serves as a master device, if the election message is received,
entering a confirmation stage in response to the confirmation message or the election message transmitted by the other device to be networked;
when the first device to be networked is in the confirmation stage:
setting the first device to be networked as the master device or a slave device in response to receiving the confirmation message transmitted by the other device to be networked;
wherein the election message includes at least information associated with the device to be networked transmitting the election message;
wherein the confirmation message includes at least information associated with the master device that is confirmed by the other device to be networked transmitting the confirmation message, and
the election message and the confirmation message include a first field indicating whether it is the election message or the confirmation message;
the election message and the confirmation message also include a second field, wherein the second field of the election message indicates a MAC address of the device to be networked transmitting the election message, and wherein the second field of the confirmation message indicates the MAC address of the device to be networked that is confirmed as the master device.

2. The method according to claim 1, wherein setting the first device to be networked as the master device or the slave device further comprises:
setting the first device to be networked as the master device or the slave device based on at least one of the confirmation message that is transmitted by the other device to be networked received when the first device is in the confirmation stage and a result of the decision of the master device made when the first device is in the election stage.

3. The method according to claim 1, further comprising at least one of the following:
when the first device to be networked is in the election stage, repeatedly transmitting the election message; and
after entering the confirmation stage, repeatedly transmitting the confirmation message until completion of the networking.

4. The method of claim 1, wherein when the first device to be networked enters the confirmation stage in response to the confirmation message received from the other device to be networked, the first device to be networked confirms that the master device indicated in the confirmation message received from the other device to be networked serves as the master device.

5. The method according to claim 1, wherein the election message further includes a third field, the third field indicating a metric of a capability of the device to be networked transmitting the election message to serve as the master device, wherein making the decision to confirm whether the other device to be networked transmitting the election message or the first device to be networked itself serves as the master device comprises:
comparing the third field of the election message received from the other device to be networked with the third field of the election message transmitted by the first device to be networked, and
setting the other device to be networked or the first device to be networked itself as the master device based on a result of the comparison.

6. The method according to claim 5, wherein, in a case where the third field of the election message received from the other device to be networked and the third field of the first device to be networked are equal, the second field of the election message received from the other device to be networked is compared with the second field of the election message transmitted by the first device to be networked, and the other device to be networked or the first device to be networked is set as the master device based on the result of the comparison.

7. The method according to claim 1, wherein there are multiple devices to be networked, and comparing a third field of the election message received from the other device to be networked with the third field of the election message transmitted by the first device to be networked and setting the other device to be networked or the first device to be networked itself as the master device based on the result of the comparison further comprises:
comparing the third field of the election message received from each of a plurality of other devices to be networked with the third field of the election message transmitted by the first device to be networked and setting one of the plurality of other devices to be networked or the first device to be networked as the master device based on the result of the comparison.

8. An electronic device, comprising a processor, a memory and a computer program stored in the memory and configured to be executed by the processor, the processor performs the method of claim 1 when performing the computer program.

9. A non-transitory computer-readable storage medium, comprising a stored computer program to control a device where the computer-readable storage medium is located to perform the method of claim 1 when the stored computer program is running.

10. An apparatus for networking applied to a first device to be networked, comprising:
an election stage hardware module, when the first device to be networked is in an election stage, used to:
receive a confirmation message or an election message transmitted by an other device to be networked,
make a decision to confirm whether the other device to be networked transmitting the election message or the first device to be networked itself serves as a master device, if the election message is received,
enter a confirmation stage in response to the confirmation message or the election message transmitted by the other device to be networked;
a confirmation stage hardware module, when the first device to be networked is in the confirmation stage, used to:
set the first device to be networked as the master device or a slave device in response to receiving the confirmation message transmitted by the other device to be networked;
wherein the election message includes at least information associated with the device to be networked transmitting the election message;
wherein the confirmation message includes at least information associated with the master device that is confirmed by the other device to be networked transmitting the confirmation message, and the election message and the confirmation message include a first field indicating whether it is the election message or the confirmation message;

the election message and the confirmation message also include a second field, wherein the second field of the election message indicates a MAC address of the device to be networked transmitting the election message, and wherein the second field of the confirmation message indicates the MAC address of the device to be networked that is confirmed as the master device.

11. A communication system, including at least two devices to be networked, each of the at least two devices to be networked configured to:

when in an election stage:

transmit an election message, receive a message from an other device to be networked, make a decision to confirm whether the other device to be networked transmitting an election message or a first device to be networked itself serves as a master device, if the election message is received from the other device to be networked, enter a confirmation stage in response to a confirmation message or the election message transmitted by the other device to be networked;

when in the confirmation stage:

transmit the confirmation message, receive a message from the other device to be networked, set itself as the master device or a slave device in response to receiving the confirmation message transmitted by the other device to be networked;

wherein the election message includes at least information associated with the device to be networked transmitting the election message; and wherein the confirmation message includes at least information associated with the master device that is confirmed by the other device to be networked transmitting the confirmation message, and the election message and the confirmation message include a first field indicating whether it is the election message or the confirmation message;

the election message and the confirmation message also include a second field, wherein the second field of the election message indicates a MAC address of the device to be networked transmitting the election message, and wherein the second field of the confirmation message indicates the MAC address of the device to be networked that is confirmed as the master device.

* * * * *